United States Patent
Chen

(10) Patent No.: US 7,377,024 B2
(45) Date of Patent: May 27, 2008

(54) METHOD OF MAKING A MAGNETIC WRITE HEAD WITH TRAILING SHIELD THROAT PAD

(75) Inventor: Tsung Yuan Chen, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 427 days.

(21) Appl. No.: 11/090,456

(22) Filed: Mar. 25, 2005

(65) Prior Publication Data

US 2006/0215314 A1    Sep. 28, 2006

(51) Int. Cl.
*G11B 5/187* (2006.01)
*B05D 5/12* (2006.01)

(52) U.S. Cl. ............... 29/603.13; 29/603.14; 360/122; 360/319; 427/128; 427/282

(58) Field of Classification Search ............ 29/603.13, 29/603.14, 603.11, 603.2; 360/122, 125, 360/119, 317, 319, 119.01, 125.03; 427/128, 427/131, 282
See application file for complete search history.

(56) References Cited

U.S. PATENT DOCUMENTS

| | | | |
|---|---|---|---|
| 4,807,076 A | | 2/1989 | Nakashima et al. |
| RE33,949 E | | 6/1992 | Mallary et al. |
| 5,155,646 A | | 10/1992 | Fujisawa et al. |
| 5,473,492 A | * | 12/1995 | Terunuma et al. ........... 360/319 |
| 5,986,856 A | * | 11/1999 | Macken et al. ............. 360/317 |
| 2002/0071208 A1 | | 6/2002 | Batra et al. |
| 2002/0176214 A1 | | 11/2002 | Shukh et al. |
| 2004/0150912 A1 | | 8/2004 | Kawato et al. |

FOREIGN PATENT DOCUMENTS

| | | | |
|---|---|---|---|
| JP | 58111116 | | 7/1983 |
| JP | 60157710 | | 8/1985 |
| JP | 60163221 | | 8/1985 |
| JP | 62177710 | | 8/1987 |
| JP | 62262213 | | 11/1987 |
| JP | 63029311 | | 2/1988 |
| JP | 63081616 | | 4/1988 |
| JP | 1048217 | | 2/1989 |
| JP | 3241511 | | 10/1991 |
| JP | 5006514 | | 1/1993 |
| JP | 7225912 | | 8/1995 |
| JP | 2002092820 | | 3/2002 |
| JP | 2002298309 | | 10/2002 |
| JP | 2004-127480 | | 12/2003 |
| JP | 2005-310363 | * | 11/2005 |

* cited by examiner

*Primary Examiner*—A. Dexter Tugbang
(74) *Attorney, Agent, or Firm*—G. Marlin Knight

(57) ABSTRACT

A method of fabricating a magnetic transducer is described which uses a trailing shield throat pad to set the trailing shield throat height. The trailing shield throat pad is used as a part of the structural form over which the material for the trailing shield is formed. The trailing shield throat pad is preferably made of a material which can selectively be removed from the gap layer with a selective etching process such as reactive-ion etching (RIE). The front edge of the trailing shield throat pad is used to define a peninsula on the trailing shield and thereby the throat of the trailing shield.

7 Claims, 4 Drawing Sheets

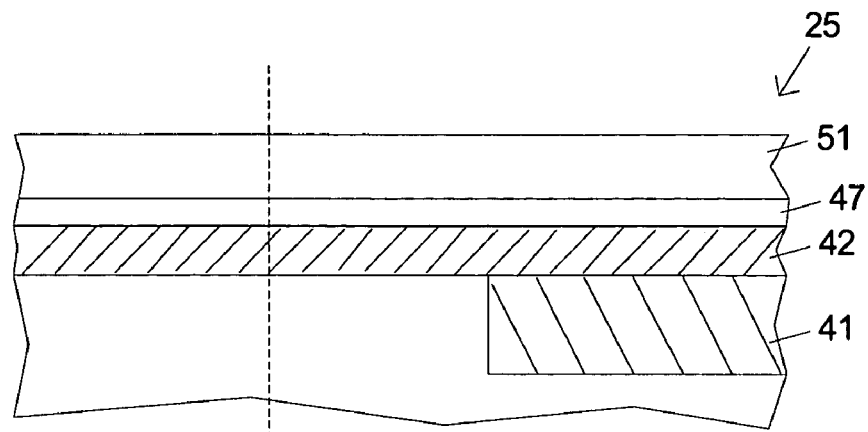
ABS→ Fig. 3
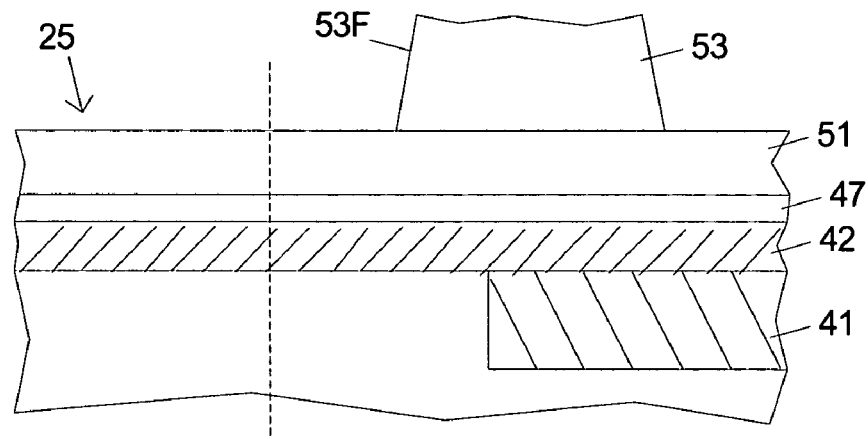
ABS→ Fig. 4
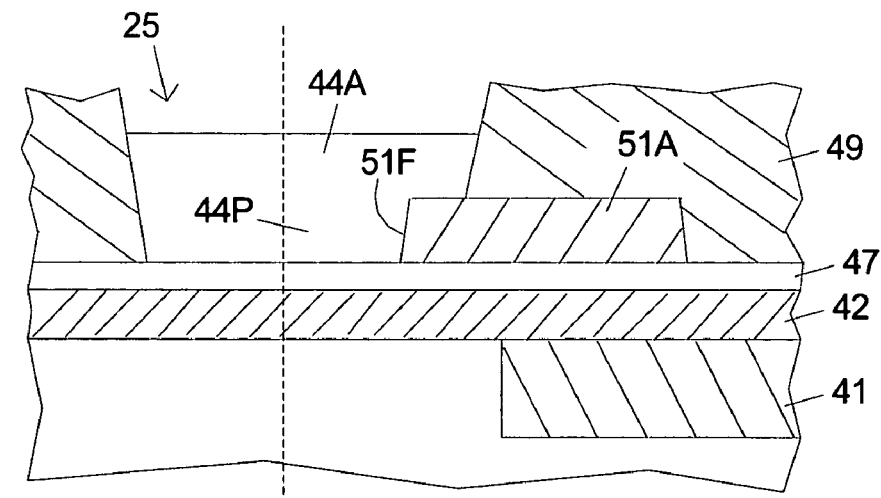
ABS→ Fig. 5

METHOD OF MAKING A MAGNETIC WRITE HEAD WITH TRAILING SHIELD THROAT PAD

FIELD OF THE INVENTION

The invention relates to thin film magnetic recording transducers for perpendicular recording and more particularly to the inductive write head portion of the transducer and even more particularly to the methods for fabricating the pole pieces for the inductive write head.

BACKGROUND OF THE INVENTION

In a typical prior art magnetic disk recording system a slider containing magnetic transducers for reading and writing magnetic transitions flies above the disk while it is being rotated by a spindle motor. The disk includes a plurality of thin films and at least one ferromagnetic thin film in which the recording (write) head records the magnetic transitions in which information is encoded. The magnetic domains in the media on can be written longitudinally or perpendicularly. The read and write head portions of the slider are built-up in layers using thin film processing techniques. Typically the read head is formed first, but the write head can also be fabricated first. The conventional write head is inductive.

In a disk drive using perpendicular recording the recording head is designed to direct magnetic flux through the recording layer in a direction which is generally perpendicular to the plane of the disk. Typically the disk for perpendicular recording has a hard magnetic recording layer and a magnetically soft underlayer. During recording operations using a single-pole type head, magnetic flux is directed from the main pole of the recording head perpendicularly through the hard magnetic recording layer, then into the plane of the soft underlayer and back to the return pole in the recording head. The shape and size of the main pole and any shields are the primary factors in determining the track width.

FIG. 1 illustrates a prior art head 26 for perpendicular recording and the associated media 27 in a disk drive 20. The section is taken perpendicular to the ABS. This figure and the others included herein are not to scale, in part, because the smaller components and spacings would be unclear. Places where the relative sizes and dimensions are significant will be noted if not known to those skilled in the art. The ABS is shown without a thin film protective overcoat which would normally be present in a production head. The term ABS as used herein means the plane as shown in the drawings without regard to whether an overcoat is present. The read sensor and its shields are not shown in FIG. 1, but could be located either to the left or right side of the write head. This design has a single coil 35. The yoke is composed of ferromagnetic pole pieces 41, 42, 43, 45 and 46. The floating trailing shield 44 is not part of the yoke. The movement of the magnetic recording medium is from the main pole piece or write pole 42 to the trailing shield 44, hence the label "trailing." The stitch pole piece 41 provides the needed mass of ferromagnetic material for the main pole piece 42, but does not extend to the ABS. Only the small area of the main pole 42 appears at the ABS. The back of the yoke 46 (often called the "back gap" for historical reasons) directly connects the stitch pole piece 41 to the return pole piece 43. The trailing shield 44 has a simple rectangular cross-section in this design, but other shapes are possible. The conventional method for producing a head as shown in FIG. 1 is to form the structures starting with the return pole piece 43 on the right. The ABS is exposed when the wafer is cut after the structures have been formed. FIG. 2 illustrates a wafer 25 on which a plurality of write heads are being fabricated. The full film trailing shield gap layer 47 has been deposited on completed main pole piece 42. A photoresist 49 has been patterned with a void which will be used to form the trailing shield in subsequent steps. The right hand edge of the photoresist 49 determines the final back edge of the trailing shield. The dimension of the trailing shield measured perpendicular from the ABS into the head is known as the "throat." The term trailing shield thickness is used to mean the dimension of the trailing shield along the ABS from the trailing shield gap layer 47 to the left edge as shown in FIG. 1. The cut for the ABS (and any lapping) determines the final ABS plane of the trailing shield. The use of a conventional photoresist for determining the throat of the trailing shield leads to imprecision which is unacceptable as the dimensions of write head designs shrink. The photoresist material is subject to erosion by the processes which are used to deposit the ferromagnetic material for the trailing shield which include plasma ashing and acid dipping as preparatory steps for electroplating NiFe. The photoresist for the electroplating process must be relatively thick which limits the achievable aspect ratio (thickness:throat ratio) for the trailing shield. Future write heads require a higher aspect ratio for the trailing shield than the current photoresist technique provides.

SUMMARY OF THE INVENTION

A method of fabricating a magnetic transducer is described which uses a trailing shield throat pad to set the trailing shield throat height. The trailing shield throat pad is formed prior to electroplating the ferromagnetic material for the trailing shield and forms a durable edge which is not subject to erosion during the plasma ashing, etc. associated with electroplating the material for the trailing shield. The trailing shield throat pad is used as a part of the structural form over which the material for the trailing shield is formed. In one embodiment the trailing shield throat pad material is deposited on the trailing shield gap layer. A photoresist is patterned over the selected area for the pad and the pad material is removed from the gap layer. The trailing shield throat pad is preferably made of a material which can selectively be removed from the gap layer with a selective etching process such as reactive-ion etching (RIE). The photoresist required to define the trailing shield throat pad can be thinner than the photoresist required to withstand the complete electroplating process. The first photoresist defining the pad is stripped off and then a second photoresist defining the trailing shield is patterned. The void in the second photoresist exposes the front edge of the trailing shield throat pad and the gap layer in front of the pad. The prior art electroplating process is then executed to deposit the ferromagnetic material for the trailing shield. The resulting trailing shield has a narrow peninsula confronting the gap layer between the front edge of the trailing shield throat pad and the plane of the ABS. The peninsula depth perpendicular to the ABS is the throat for the trailing shield.

BRIEF DESCRIPTION OF THE FIGURES

FIG. 3 is an illustration of an embodiment of a process according to the invention for forming a trailing shield for a write head on a wafer. The section is taken perpendicular to the surface of the wafer and shows a snapshot of a point in the process where the full film layer for the trailing shield throat pad has been deposited.

FIG. 4 is an illustration of an embodiment of a process according to the invention showing a snapshot of a point in the process subsequent to that shown in FIG. 3 after a photoresist has been patterned in preparation for forming the trailing shield throat pad.

FIG. 5 is an illustration of an embodiment of a process according to the invention showing a snapshot of a point in the process subsequent to that shown in FIG. 4 after the trailing shield throat pad has been formed, a photoresist has been patterned in preparation for forming the trailing shield and the trailing shield has been deposited.

DETAILED DESCRIPTION OF THE INVENTION AND THE PREFERRED EMBODIMENTS

Figure 1:
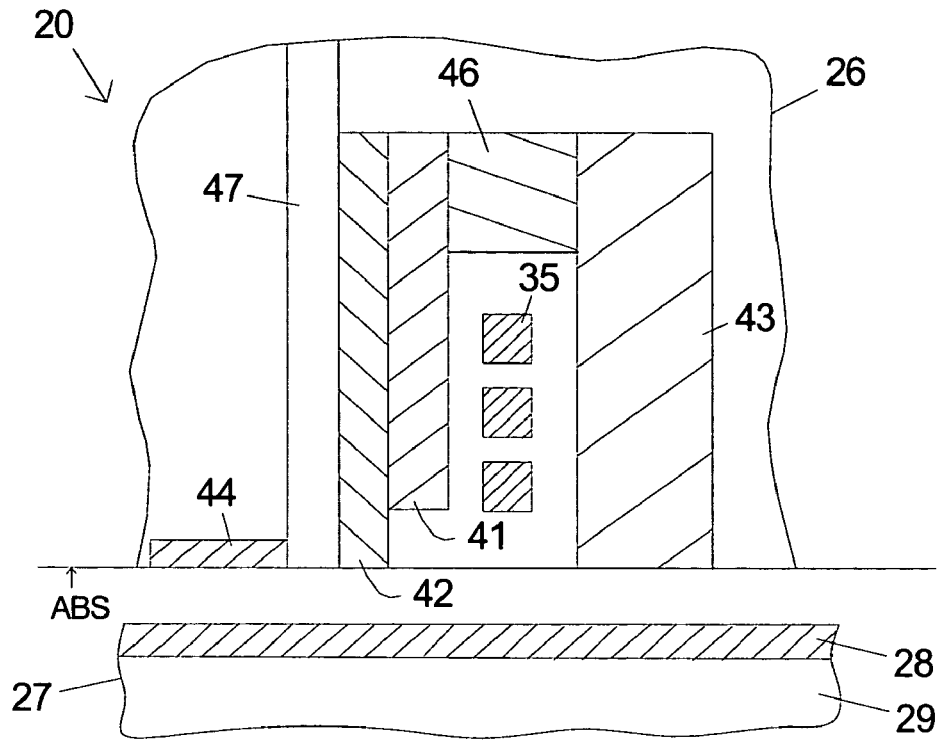
FIG. 1 is a symbolic illustration of selected components in a prior art disk drive illustrating a prior art recording head and media for perpendicular recording. The section is taken perpendicular to the air-bearing surface.
Figure 2:
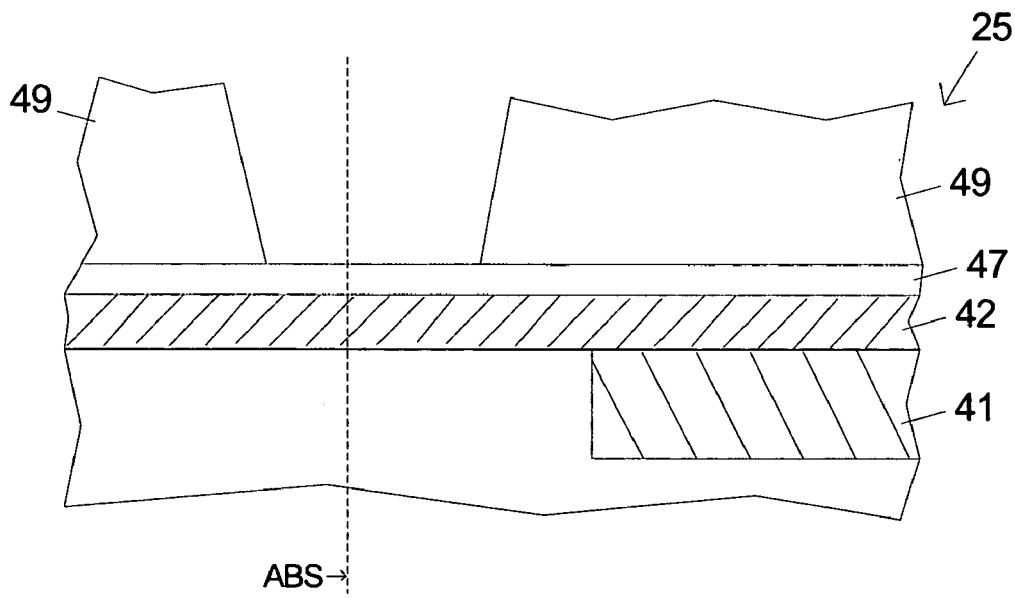
FIG. 2 is an illustration of the prior art process for forming a trailing shield for a write head on a wafer. The section is taken perpendicular to the surface of the wafer and shows a snapshot of a point in the process where the photoresist has been patterned in preparation for electroplating the trailing shield.

Reference is made to FIG. 3 which is an illustration of an embodiment of a process according to the invention for forming a trailing shield for a write head on a wafer 25. The section is taken perpendicular to the surface of the wafer and shows a snapshot of a point in the process where the full thin film layer of pad material 51 for the trailing shield throat pad has been deposited. In this embodiment the pad material 51 is deposited directly on the trailing shield gap layer 47. In an alternative embodiment, a seed layer for the subsequent electroplating process can be deposited on the gap layer prior to the pad material. The pad material is selected using criterion which include a) resistance to the various process steps including in the electroplating process including, for example, plasma ashing and acid dipping; and etching selectivity over the gap layer material. The pad material is preferably a material which can be selectively removed from the gap layer by a process such reactive-ion etching (RIE). The standard gap material is alumina, so the pad material is selected to be one which can be removed by a process which will not attack the underlying alumina. Suitable materials for both the gap layer and the pad can be selected according to the prior art principles. Using alumina as the gap layer, suitable materials known in the prior art for the pad include silicon dioxide, silicon oxide, and silicon nitride. The thickness of the layer determines the height of the final trailing shield throat pad which can vary over a wide range, for example, 500 angstroms to 2 microns.

FIG. 4 shows a snapshot of a point in the process subsequent to that shown in FIG. 3 after a photoresist pad 53 has been patterned in preparation for forming the trailing shield throat pad. The front edge 53F of the pad is recessed back from the ABS line. The placement of the front edge 53F determines the placement of the corresponding front edge of the trailing shield throat pad in future steps. The width (left to right) of the photoresist pad 53 as shown is relatively small, but it can extend arbitrarily toward the back of the yoke. Thus, the position of the back edge of the photoresist pad 53 and ultimately the back edge of the trailing shield throat pad is not critical. The wafer shown in FIG. 4 is subjected to the selective etching process, preferably RIE to remove all of the exposed pad layer material down to the gap layer.

FIG. 5 is shows a snapshot of a point in the process subsequent to that shown in FIG. 4 after multiple process steps have been executed. After the RIE process has been executed, only the portion pad layer protected by the photoresist remains. The remaining pad material forms the trailing shield throat pad 51A. The prior art process is resumed at this point and the prior art photoresist 49 has been patterned in preparation for forming the trailing shield. The void into which the ferromagnetic material for the trailing shield is deposited includes at least the front edge 51F of the trailing shield throat pad 51A, so that the front edge 51F of the trailing shield throat pad determines the back edge of the throat of the trailing shield. The process for forming the trailing shield, including plasma ashing and acid dipping, can be executed according to the prior art without eroding the trailing shield throat pad 51A which is made from a resistant material. The shape of the trailing shield 44A includes the peninsula 44P formed between the front edge 51F of the trailing shield throat pad 51A and the ABS plane. The peninsula depth perpendicular to the ABS defines the throat of the trailing shield. The peninsula 44P of the trailing shield 44A can be made narrower with greater precision through the use of trailing shield throat pad 51A.

Figure 6:
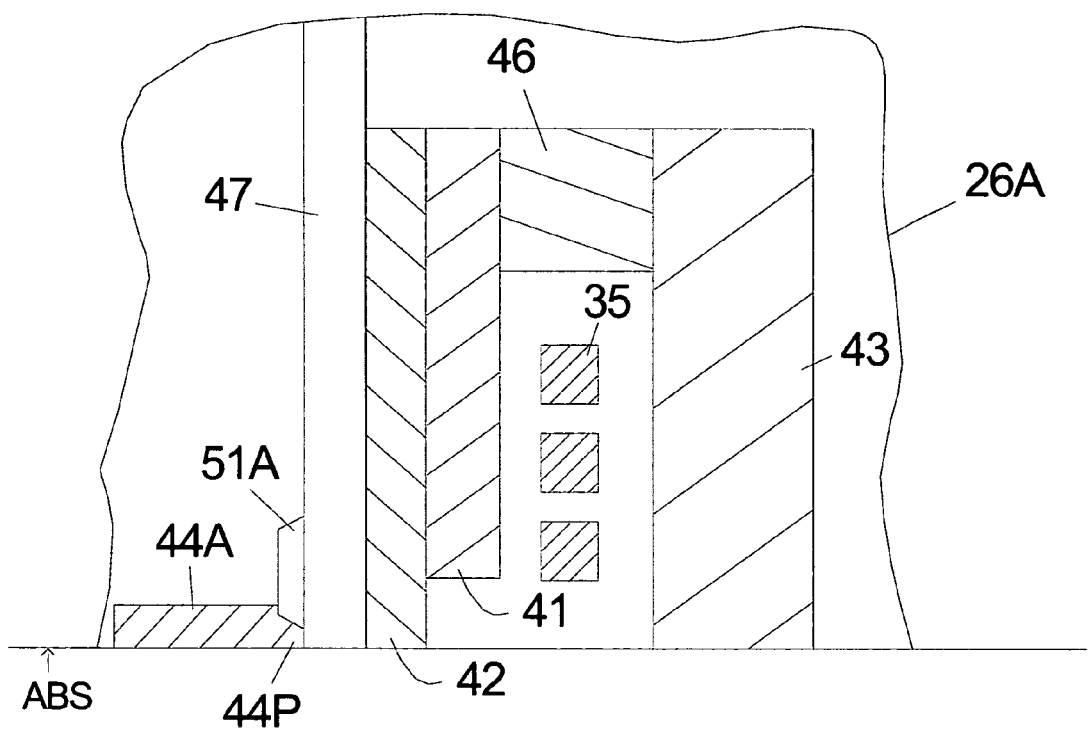
FIG. 6 is an illustration of a write head according to the invention shown in section perpendicular to the air-bearing surface.

The prior art process of fabricating a completed head is resumed at this point. The wafer is ultimately cut along or near the line shown as the ABS. If a lapping process is included, the cut line is to the left of the ABS and the material between the cut plane and the final ABS plane is removed by lapping. The ABS features needed for the head to fly on an air-bearing are formed after the wafer is cut. The air-bearing features are formed away from the write head structures and would not be seen in a section view of the head on the scales shown herein. A completed write head 26A according to the invention is shown in section in FIG. 6. The trailing shield 44A is magnetically floating. An overcoat is typically applied over the air-bearing surface including the write head and would appear as a very thin layer separating the components from the physical surface. No overcoat is shown in FIG. 6, since it is not relevant to the invention and is optional. The overcoat can also be deposited during manufacturing and abraded off during the initial phases of operating the drive.

Figure 7:
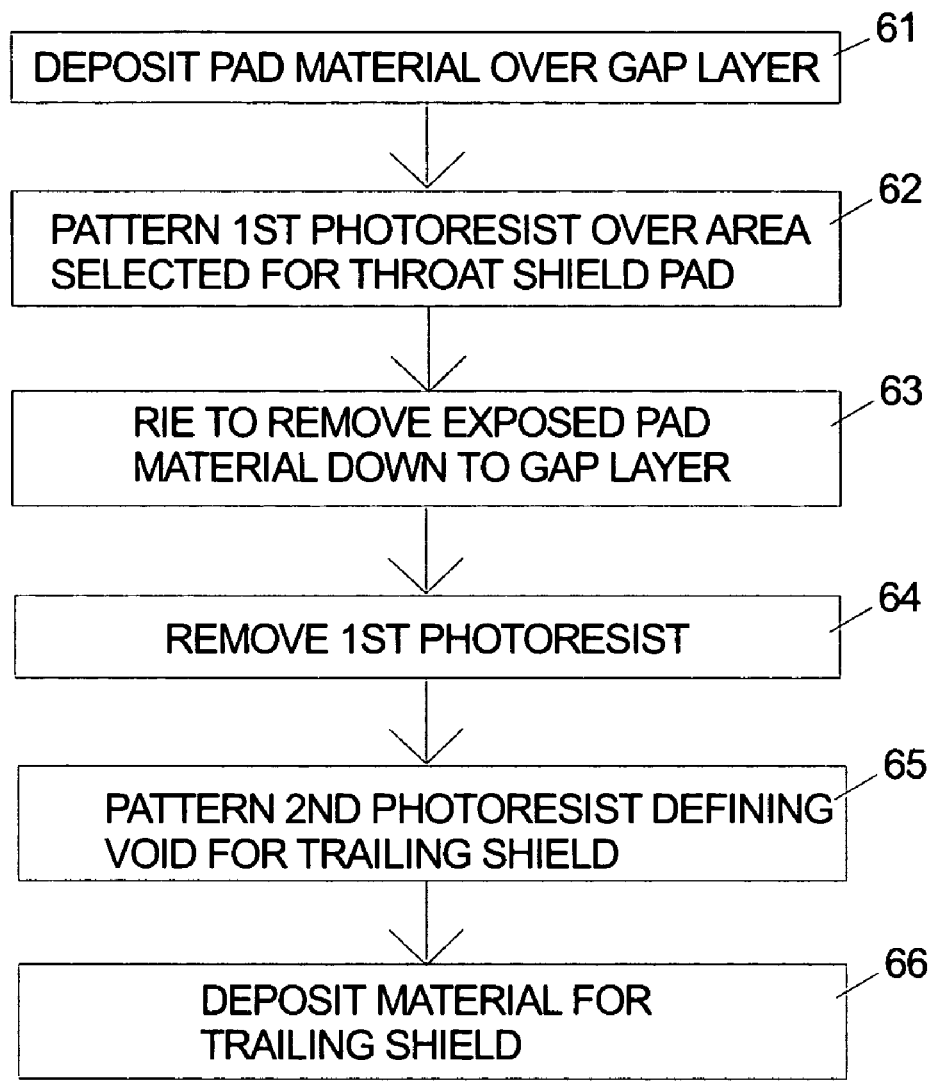
FIG. 7 is a flowchart of the embodiment of a method according to the invention.

FIG. 7 is a flowchart of the embodiment of the process described above. The layer of material for the trailing shield throat pad is deposited on the gap layer 61. The first photoresist is formed to define the shape and position of the trailing shield throat pad 62. A RIE process is used to remove the exposed pad material leaving only the trailing shield throat pad 63. The first photoresist is removed 64. The second photoresist is patterned to define the void for the trailing shield 65. The void includes at least the front edge of the trailing shield throat pad. The trailing shield material is deposited in the void to form a trailing shield with a peninsula according to the invention 66.

The write head according to the invention can be fabricated before or after the read head. The invention has been described with respect to particular embodiments, but other uses and applications for the ferromagnetic structure according to the invention will be apparent to those skilled in the art.

The invention claimed is:

1. A method of fabricating a thin film magnetic recording head comprising the steps of:
    forming a main pole piece on a wafer;
    depositing a gap layer over the main pole piece;
    depositing a layer of selected material for a trailing shield throat pad over the gap layer, the selected material being different from a material of the gap layer;
    patterning a first photoresist pad over a selected area on the layer of selected material, selected areas defining the trailing shield throat pad with a front edge disposed in a plane which is recessed from a predetermined plane for an air-bearing surface;
    removing the selected material exposed around the first photoresist pad to form the trailing shield throat pad from the selected material and to expose the gap layer between the trailing shield throat pad and the predetermined plane for the air-bearing surface;
    removing the first photoresist pad;
    patterning a second photoresist to form a void for a trailing shield, the void extending from a first side of the predetermined plane for the air-bearing surface beyond the front edge of the trailing shield throat pad; and
    depositing ferromagnetic material for the trailing shield into the void to form a peninsula on a portion of the trailing shield between the front edge of the trailing shield throat pad and the predetermined plane for the air-bearing surface.

2. The method of claim 1 wherein the void for the trailing shield ends over the trailing shield throat pad so that the trailing shield throat pad extends outside of the void.

3. The method of claim 1 wherein the step of removing the selected material further comprises using reactive-ion etching.

4. The method of claim 1 wherein the step of depositing ferromagnetic material for the trailing shield further comprises electroplating a metal after plasma ashing.

5. The method of claim 1 wherein the selected material for the trailing shield throat pad comprises silicon dioxide, silicon oxide or silicon nitride.

6. The method of claim 1 wherein the step of depositing ferromagnetic material for the trailing shield further comprises electroplating a metal after acid dipping.

7. The method of claim 1 wherein gap layer is alumina and the selected material for the trailing shield throat pad comprises silicon dioxide, silicon oxide or silicon nitride.

* * * * *